United States Patent [19]

Clark

[11] 4,148,617
[45] Apr. 10, 1979

[54] WATER RECOVERY DEVICE
[76] Inventor: John F. Clark, 733 NW. 12th Ave., Ft. Lauderdale, Fla. 33311
[21] Appl. No.: 855,615
[22] Filed: Nov. 29, 1977
[51] Int. Cl.² .......................... B01D 53/00; F25J 3/04
[52] U.S. Cl. .......................................... 55/267; 55/27; 62/93
[58] Field of Search .................. 55/23, 27, 29, 267; 62/93, 410–415

[56] References Cited

U.S. PATENT DOCUMENTS

| 108,707 | 10/1870 | Krausch | 62/411 |
|---|---|---|---|
| 242,368 | 5/1881 | Reynolds | 55/29 |
| 1,853,236 | 4/1932 | Shadle | 55/27 |
| 1,982,622 | 12/1934 | Anger | 62/93 |
| 2,138,689 | 11/1938 | Altenkirch | 62/93 X |
| 2,499,982 | 3/1950 | Suiter | 62/93 X |
| 2,996,897 | 8/1961 | Grimes | 62/93 X |
| 3,675,442 | 7/1972 | Swanson | 62/93 X |
| 4,050,262 | 9/1977 | Mehnert | 62/93 X |

*Primary Examiner*—Robert H. Spitzer
*Attorney, Agent, or Firm*—Shlesinger, Arkwright, Garvey & Dinsmore

[57] ABSTRACT

A device for recovering water from ambient air is disclosed having two chambers in one of which a pressurized air stream is heated and in the other of which another pressurized air stream is cooled after which the two air streams are mixed resulting in condensation of the moisture contained in the air streams which is then collected and put to use.

2 Claims, 1 Drawing Figure

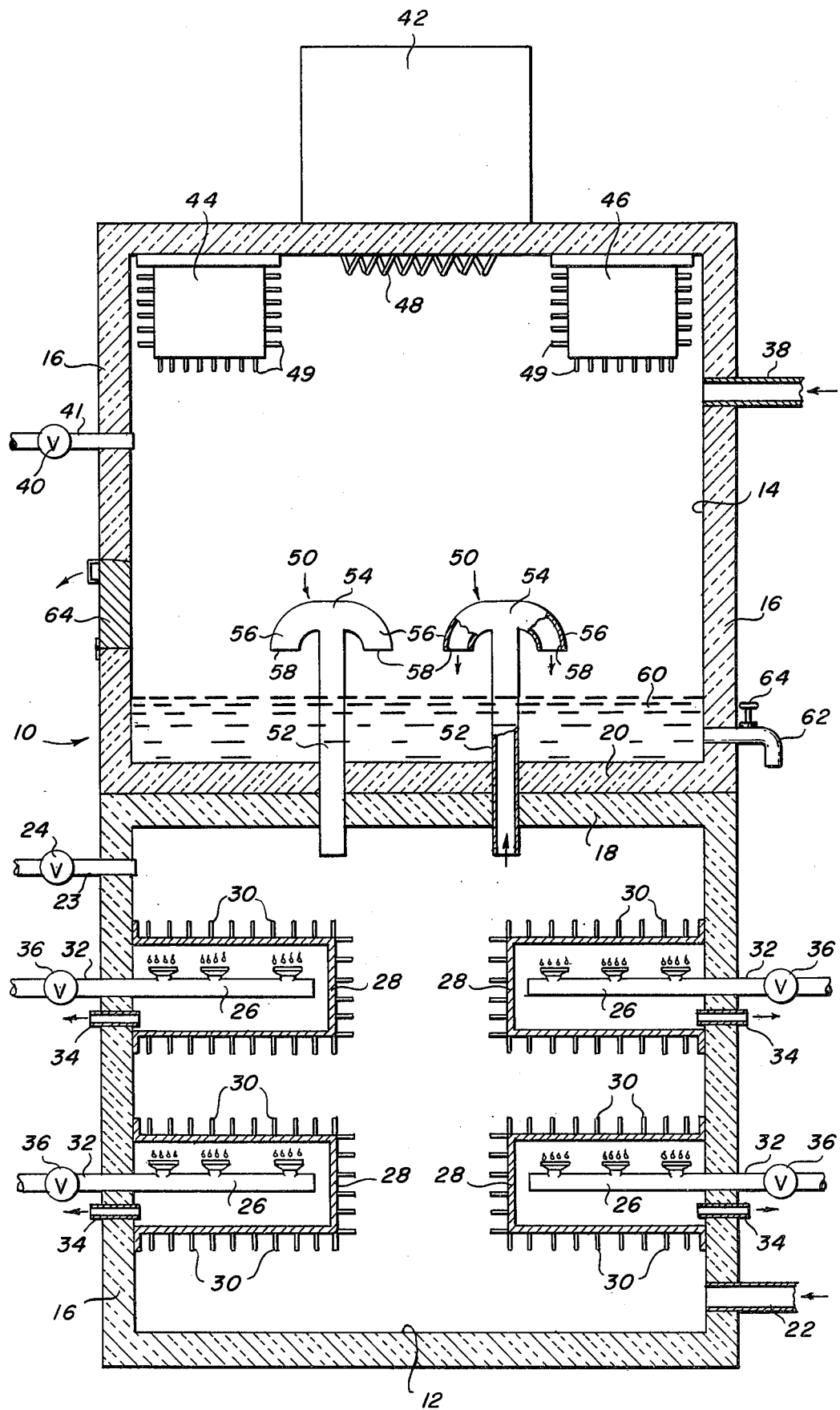

WATER RECOVERY DEVICE

FIELD OF THE INVENTION AND BACKGROUND

This invention relates to the art concerned with water recovery devices and processes and is particularly concerned with a device and method for removing moisture from ambient air.

Droughts and water shortages and the water use restrictions placed on communities as a result of them are an ever present problem in our modern society.

Areas so affected have often been forced to take costly measures to make due during a water crisis spending money that can be little afforded such as by buying water from neighboring communities and importing it, sometimes by truck. Such a measure would seem unnecessary when one considers that areas so affected often are subject to weather patterns which, while not bringing them rain, often produce humid air with a significant amount of unpolluted moisture contained therein.

Such conditions often occur in the summer months when rainfall is low but relative humidity more often than not is at high levels.

What is needed therefore is a practical method and apparatus for removing water vapor from ambient air containing moisture and collecting it for useful purposes.

OBJECTS AND SUMMARY OF THE INVENTION

An object of this invention is to provide a device which will help mitigate the effects of droughts and water shortages by tapping a readily available unused source of unpolluted water.

An object of this invention is to provide a device for removing water vapor from ambient air containing moisture and collecting it for useful purposes.

A further object of this invention is to provide a device which may be operated on any scale and which will efficiently recover larger amounts of water from ambient air than devices previously known.

These objects are achieved by a device in which a first stream of normal ambient air is pressurized and heated and a second stream of normal ambient air is pressurized and cooled after which the two bodies of air are turbulently mixed to cause condensation of the moisture contained therein. The device comprises two chambers one of which has heating elements into which a stream of pressurized ambient air is fed and heated and the other chamber of which has cooling units into which another stream of pressurized ambient air is fed and cooled. The heated body of ambient air is fed by conduits interconnecting the two chambers into the cooling chamber where, upon contact with the cooled air contained therein, the moisture contained in the air condenses and is recovered.

The device works more efficiently and with a greater yield the greater the water vapor content of the ambient air being treated.

BRIEF DESCRIPTION OF THE DRAWING

The drawing is a schematic representation of a preferred embodiment of the device of this invention.

DETAILED DESCRIPTION

Referring to the FIGURE which shows one embodiment of the device of this invention, the unit 10 has a lower chamber 12 and an upper chamber 14 positioned directly above the lower chamber 12. Both chambers 12 and 14 have insulated exterior walls 16 and insulated walls 18, 20 between them. Leading into lower chamber 12 is air line 22 which feeds a stream of air into the chamber 12. This air stream is composed of ambient air containing the normal amount of moisture found therein and is pressurized prior to injection into chamber 12 to a pressure of 20 pounds per square inch or more by a suitable compressor (not shown). Connected by a conduit 23 to the lower chamber 12 is a pressure regulation valve 24 which serves to maintain the air pressure in lower chamber 12 at the 20 pound square inch value or whatever greater pressure is desired.

Positioned about the lower chamber 12 are four fuel burners 26 each of which is located within a housing 28 which separates the burners 26 from the pressurized ambient air in the chamber 12 thus preventing the contamination of the ambient air with fuel gases and vapors and the gases of combustion. The housings 28 are made from a heat conductive material so that the heat generated by the burners 26 may be transferred through the housings 28 to the pressurized ambient air in the lower chamber 12. Heating of the air is, therefore, by indirect heating. To further facilitate heat transfer, the housings 28 contain a plurality of fins 30 to increase the heat transfer surface area. The pressurized ambient air in chamber 12 is heated in this manner to a temperature of 100° F. or more.

Each fuel burner 26 is fed by a conduit 32 which supplies a fuel/air mixture for combustion purposes. Any gaseous or vaporous fuel may be used such as natural gas, propane, or gasoline or mixtures thereof. Each burner 26 has an exhaust outlet 34 for the escape of combustion gases and a valve 36 in the fuel/air line 32 which may be used to individually shut off the burners 26 so that any number of them may be used.

Upper chamber 14 has an air line 38 connected thereto which feeds a stream of ambient air into upper chamber 14. The air stream is pressurized by a compressor (not shown) and is composed of normal ambient air containing the normal amount of moisture therein. The air pressure in upper chamber 14 is maintained at 20 pounds per square inch or greater as desired, the pressure level being controlled by a pressure regulation valve 40 connected to the upper chamber 14 by a conduit 41. Whatever the pressure level in chamber 14 it must be slightly less than the pressure in chamber 12 for a reason to be discussed below.

Positioned about upper chamber 14 are cooling units 42, 44, 46 which serve to cool the pressurized ambient air in the upper chamber 14 down to a temperature of −20° F. or less. The cooling units 42, 44, 46 are situated about the upper portion of the chamber 14 in the vicinity of which will be the warmest portions of the air in chamber 14 due to the warm ambient air incoming from line 38 and the natural tendency for the warmer air already in chamber 14 to rise. Upon cooling the air will settle to the lower portion of the chamber 14. Cooling unit 42 is a refrigeration unit having cooling coils 48. Units 44 and 46 are containers made from a heat conductive material which hold dry ice. To facilitate heat transfer from the air contained in upper chamber 14, the units 44 and 46 each have a plurality of fins 49.

Interconnecting the upper and lower chambers 12, 14 are two similar conduit assemblies 50 comprising substantially vertically disposed conduits 52 each having a lower end positioned in the lower chamber 12 adjacent the top thereof and an upper end positioned in the upper chamber 14. Each vertical conduit 52 has a generally horizontally disposed conduit 54 on its upper end to the mid portion of which it is connected. Each horizontal conduit 54 has downwardly curving end portions 56 with openings 58 at the ends thereof facing generally downward. While two such conduit assemblies 50 have been shown, the number used may vary from only one to as many as desired.

Due to the slight pressure gradient between lower chamber 12 and upper chamber 14, the heated pressurized ambient air contained in lower chamber 12 will flow upwardly into the conduit assemblies 50 from which the heated air will be downwardly discharged at openings 58. The heated air will then contact the coldest air contained in the upper chamber 14 and, as it changes direction and begins to rise, will generate localized turbulence due to the convective currents. The localized temperature gradients and turbulence will result in condensation of the moisture previously contained in the air. The condensed water will thereupon fall to the base of the upper chamber 14 where it is collected into a pool of water 60. As the pool of water 60 grows in depth, water may be drained off through the conduit 62 having a valve 64 therein and collected to be later put to whatever use may be desired.

Pressure regulation valve 40 and conduit 41 as part of their function in regulating the air pressure in upper chamber 14 also serve as the exhaust conduit for the system acting to release the air which would otherwise build up in upper chamber 14 due to the incoming streams from openings 58 and line 38.

For access to the interior of the chambers 12, 14 the chamber wall 16 may contain conveniently located access ports such as the one shown at 64.

While this invention has been described as having a preferred design, it will be understood that it is capable of further modification. This application, is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. A device for recovering water from ambient air, comprising:

(a) first and second chambers with said second chamber positioned directly above said first chamber, said chambers having insulated walls;
 (b) first pressurized ambient air supply means for pressurizing a stream of ambient air and supplying the stream of pressurized ambient air to said first chamber;
 (c) heating means positioned about said first chamber for indirectly heating the pressurized ambient air in said first chamber;
 (d) first chamber pressure regulatory means for maintaining the air pressure in said first chamber at a pressure of at least 20 pounds per square inch;
 (e) second pressurized ambient air supply means for pressurizing a stream of ambient air and supplying the stream of pressurized ambient air to said second chamber;
 (f) cooling means positioned about said second chamber for indirectly cooling the pressurized ambient air in said second chamber;
 (g) second chamber pressure regulatory and air exhaust means for maintaining the air pressure in said second chamber at a pressure of at least 20 pounds per square inch but less than the pressure being maintained in said first chamber and for exhausting air from said second chamber;
 (h) at least one conduit assembly interconnecting said first chamber and said second chamber, each said at least one conduit assembly having a substantially vertically disposed conduit and a generally horizontally disposed conduit, said vertically disposed conduit having a lower end positioned in said first chamber adjacent to the top thereof and an upper end positioned in said second chamber, said horizontally disposed conduit being connected at its mid-portion to said upper end of said vertically disposed conduit and having downwardly curving ends with openings at said ends facing generally downwards so that, with the pressure gradient between said chambers, heated pressurized ambient air flows through said at least one conduit assembly and is downwardly discharged from said horizontally disposed conduit openings to contact the cooled pressurized ambient air of said second chamber resulting in the condensation of the moisture contained in the air; and,
 (i) collecting and removing means for collecting the condensed water in said second chamber and removing the condensed water from said second chamber.

2. The device of claim 1 wherein said heating means includes fuel burners attached to said first chamber and fuel burner housings separating said fuel burners from the pressurized ambient air in said first chamber, said fuel burner housings permitting indirect heat transfer between said fuel burners and the pressurized ambient air in said first chamber.

* * * * *